United States Patent
Tsai et al.

(10) Patent No.: US 9,268,791 B2
(45) Date of Patent: Feb. 23, 2016

(54) METHOD AND APPARATUS FOR IMAGE PROCESSING AND COMPUTER READABLE MEDIUM

(71) Applicant: INDUSTRIAL TECHNOLOGY RESEARCH INSTITUTE, Hsinchu (TW)

(72) Inventors: Luo-Wei Tsai, Kaohsiung (TW); Guo-Ruei Chen, Yunlin County (TW); Kual-Zheng Lee, Chiayi County (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 109 days.

(21) Appl. No.: 14/223,449

(22) Filed: Mar. 24, 2014

(65) Prior Publication Data

US 2015/0169632 A1 Jun. 18, 2015

(30) Foreign Application Priority Data

Dec. 12, 2013 (TW) ............... 102145947 A (51) Int. Cl.
*G06F 17/30* (2006.01)

(52) U.S. Cl.
CPC ................ *G06F 17/30244* (2013.01)

(58) Field of Classification Search
None
See application file for complete search history.

(56) References Cited

U.S. PATENT DOCUMENTS

| | | | |
|---|---|---|---|
| 5,933,542 A | 8/1999 | Chang et al. | |
| 7,965,900 B2 | 6/2011 | Maurer et al. | |
| 8,090,028 B2 | 1/2012 | Hellman | |
| 8,139,651 B2 | 3/2012 | Huang | |
| 8,165,215 B2* | 4/2012 | Aharon | G06K 9/6249 375/240.22 |
| 8,290,251 B2* | 10/2012 | Mahajan | G06K 9/40 382/159 |
| 8,494,305 B2* | 7/2013 | Porikli | G06T 5/002 382/225 |
| 2009/0010501 A1 | 1/2009 | Ogawa | |
| 2009/0198716 A1* | 8/2009 | Howarth | H03M 7/3088 |
| 2010/0020208 A1* | 1/2010 | Barbu | G06K 9/40 348/250 |
| 2010/0046829 A1* | 2/2010 | Mahajan | G06K 9/40 382/159 |
| 2010/0128803 A1* | 5/2010 | Divorra Escoda | H04N 19/159 375/240.29 |
| 2013/0156340 A1* | 6/2013 | Porikli | G06T 5/002 382/275 |

(Continued)

FOREIGN PATENT DOCUMENTS

| | | |
|---|---|---|
| CN | 102088606 A | 6/2011 |
| TW | 325635 | 1/1998 |

(Continued)

OTHER PUBLICATIONS

Taiwan Patent Office, Office Action, Patent Application No. TW102145947, Aug. 21, 2015, Taiwan.

(Continued)

*Primary Examiner* — Sean Motsinger
(74) *Attorney, Agent, or Firm* — Rabin & Berdo, PC (57) ABSTRACT

According to one exemplary embodiment, a method for image processing selects at least one image from a plurality of images, and stores the plurality of images into a buffer, until a storage space of the buffer reaches a criterion. When the storage space of the buffer reaches the criterion, a procedure of image processing is performed for a plurality of temporary images stored in the buffer, which includes constructing an image dictionary according to the at least an image selected, and performing an image recovery and reconstruction procedure for the plurality of temporary images in the buffer according to the image dictionary, thereby obtaining a plurality of reconstructed images.

20 Claims, 8 Drawing Sheets

(56) References Cited

U.S. PATENT DOCUMENTS

| | | | | |
|---|---|---|---|---|
| 2014/0301661 A1* | 10/2014 | Voronov | ............... | G06T 3/4053 382/275 |
| 2015/0169632 A1* | 6/2015 | Tsai | .................. | G06F 17/30244 382/305 |
| 2015/0215529 A1* | 7/2015 | Wang | ................... | G06K 9/2018 348/218.1 |

FOREIGN PATENT DOCUMENTS

| TW | 452710 B | 9/2001 |
|---|---|---|
| TW | 201028018 A | 7/2010 |
| TW | 201101846 A | 1/2011 |

OTHER PUBLICATIONS

Super-Resolution Based on Sparse Dictionary Coding, Li M, Cheng J, Le x, Luo HM, Journal of Software, 2012,23(5): 1315-1324. http://www.jos.org.cn/100-9825/3989.htm, May 2011.

K. He, J. Sun, and X. Tang, "Guided Image Filtering," Pattern Analysis and Machine Intelligence, IEEE Transactions on, vol. 35, No. 6, pp. 1397-1409, 2013.

G. M. Farinella and S. Battiato, "On the application of structured sparse model selection to JPEG compressed images," presented at the Proceedings of the Third international conference on Computational color imaging, Milan, Italy, 2011.

M. Elad and M. Aharon, "Image Denoising Via Sparse and Redundant Representations Over Learned Dictionaries," Image Processing, IEEE Transactions on, vol. 15, No. 12, pp. 3736-3745, 2006.

L.-W. Kang, C.-W. Lin, and F. Yu-Hsiang, "Automatic Single-Image-Based Rain Streaks Removal via Image Decomposition," Image Processing, IEEE Transactions on, vol. 21, No. 4, pp. 1742-1755, 2012.

C. Yi-Wen, Y. Chia-Hung, K. Li-Wei, L. Chia-Wen, and F.-J. Shu-Jhen, "Efficient image/video deblocking via sparse representation," in Proc. oftheVisual Communications and Image Processing (VCIP), 2012 IEEE, pp. 1-6, 2012.

W. Zhou, A. C. Bovik, H. R. Sheikh, and E. P. Simoncelli, "Image quality assessment: from error visibility to structural similarity," Image Processing, IEEE Transactions on, vol. 13, No. 4, pp. 600-612, 2004.

J. Mairal, F. Bach, J. Ponce, G. Sapiro, and A. Zisserman, "Non-local sparse models for image restoration," in Proc. oftheComputer Vision, 2009 IEEE 12th International Conference on, pp. 2272-2279, 2009.

M. J. Fadili, J. L. Starck, J. Bobin, and Y. Moudden, "Image Decomposition and Separation Using Sparse Representations: An Overview," Proceedings of the IEEE, vol. 98, No. 6, pp. 983-994, 2010.

J. Mairal, F. Bach, J. Ponce, and G. Sapiro, "Online dictionary learning for sparse coding," presented at the Proceedings of the 26th Annual International Conference on Machine Learning, Montreal, Quebec, Canada, 2009.

C. Jung, L. Jiao, H. Qi, and T. Sun, "Image deblocking via sparse representation," Signal Processing: Image Communication, vol. 27, No. 6, pp. 663-677, 2012.

* cited by examiner

| 16 | 60 | 25 | 82 | 10 | 86 | 43 | 15 | 85 | 7 |
| 79 | 26 | 15 | 53 | 96 | 8 | 91 | 15 | 62 | 23 |
| 31 | 65 | 5 | 99 | 0 | 39 | 18 | 10 | 35 | 12 |
| 52 | 68 | 10 | 7 | 77 | 25 | 26 | 20 | 51 | 18 |
| 16 | 74 | 20 | 44 | 81 | 80 | 14 | 5 | 40 | 23 |

620

=

| 40 |
| 30 |
| 15 |
| 30 |
| 25 |

METHOD AND APPARATUS FOR IMAGE PROCESSING AND COMPUTER READABLE MEDIUM

CROSS-REFERENCE TO RELATED APPLICATION TECHNICAL FIELD

The present application is based on, and claims priority from, Taiwan Patent Application No. 102145947, filed Dec. 12, 2013, the disclosure of which is hereby incorporated by reference herein in its entirety.

TECHNICAL FIELD

The technical field generally relates to a method and apparatus for image processing and computer readable medium.

BACKGROUND

One of key factors impacting the video streaming quality is the bandwidth of the transmission network. When the video streaming is transmitted through the network, a compression method with a lower bit rate is often applied in the limited bandwidth situation, which results in low quality in reconstructed video images. The reasons include, but not limited to, blocking effect images caused during reconstruction, video noise images or raindrop images. Block-based codec is also widely applied to image compression, such as, JPEG, MPEG and H.264. Recently, the sparse representation is used for image reconstruction to improve the reconstructed image quality.

The sparse representation is widely used in image processing, such as, reducing blocking effect, filtering noise or eliminating raindrops. The sparse representation technique prepares a large a large amount of reference images to construct a representative image feature dictionary in advance, and uses a large number of complex matrix computations to reconstruct the image feature dictionary, which is used to recovery the defect images. The sparse representation requires sufficient memory to store the large amount of reference images and also requires sufficient computation power to execute the large amount of complex matrix computations.

The sparse representation using a single reference image does not require preparing a large amount of reference images, and may perform dictionary learning by capturing a meaningful part of a self image. For example, there exists a technique to capture gradient information in different orientations in a single image and use a histogram of oriented gradients (HOG) features to decompose the single image into a raindrop part and a non-raindrop part to perform the dictionary learning according to orientation. The subsequent recovery or reconstruction uses the non-raindrop part dictionary to eliminate the raindrops from the image. Another technique is to divide the HOG features of the reference image into a horizontal part and a vertical part for performing the dictionary learning and for eliminate the image blocking effect.

In the above known image reconstruction or recovery techniques, some techniques collect in advance a large amount of natural images to construct image feature dictionary and use the image feature dictionary to recovery defect images. These techniques are difficult to adapt to different image scenes. Some other techniques avoid collecting large amount of reference images, but each image is recaptured and trained for an image dictionary in a dynamic video. Therefore, an effective approach to reduce image blocking effect and require a small amount of reference memory to obtain good image quality is an important research topic.

SUMMARY

The embodiments of the present disclosure provide a method and apparatus for imaging processing and computer readable medium.

An exemplary embodiment relates to an image processing method, comprising: selecting at least one image from a plurality of images, and storing the plurality of images into a buffer, until a storage space of the buffer reaching a criterion; and when the storage space of the buffer reaching the criterion, a procedure of image processing being performed for a plurality of temporary images in the buffer, which including constructing an image dictionary according to the at least an image selected, and performing an image recovery and reconstruction procedure for the plurality of temporary images in the buffer according to the image dictionary, thereby obtaining a plurality of reconstructed images.

Another embodiment relates to a computer readable medium, comprising a plurality of instructions; wherein the plurality of instructions are executed for performing the said image processing method.

Yet another embodiment relates to an image processing apparatus, comprising an image dictionary construction module, an image recovery and reconstruction module and a memory. The image dictionary construction module selects at least an image from a plurality of images and stores the plurality of images into a buffer, until a storage space of the buffer reaches a criterion. Then, for a plurality of temporary images stored in the buffer, at least a temporary image matching an image similarity condition is decomposed into at least a high frequency image and a low frequency image, and a statistic of a features distribution of the at least a high frequency image is computed to construct an image dictionary. The image recovery and reconstruction module performs a recovery on a plurality of high frequency images in the plurality of temporary images in the buffer according to the image dictionary, and combines a plurality of recovered high frequency images, and a plurality of low frequency images obtained from the plurality of temporary images, thereby obtaining a plurality of reconstructed images.

The foregoing will become better understood from a careful reading of a detailed description provided herein below with appropriate reference to the accompanying drawings.

DETAILED DESCRIPTION OF THE DISCLOSED EMBODIMENTS

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

According to the exemplary embodiments of the present disclosure, an image processing technique is provided, which uses a learning mechanism of dynamically adjusted image dictionary to select a plurality of representative images and decomposes stored temporary images matching a similarity condition into high frequency images and low frequency images. A statistics of the feature distribution of the high frequency images is computed and the feature blocks are used to construct an image dictionary. The image dictionary being trained is then used to perform a recovery on the high frequency images of recovered images and the high frequency images recovered and the low frequency images are added to obtain processed images. In the present disclosure, the peak signal-to-noise (PSNR) of the image signals and the structural similarity (SSIM) are used as the quantitative index for video quality to measure and verify the exemplary embodiments of the present disclosure. The higher the PSNR is, the lower the video quality distortion is. The SSIM ranges between 0 and 1. A higher SSIM means closer to the original image.

Figure 1:
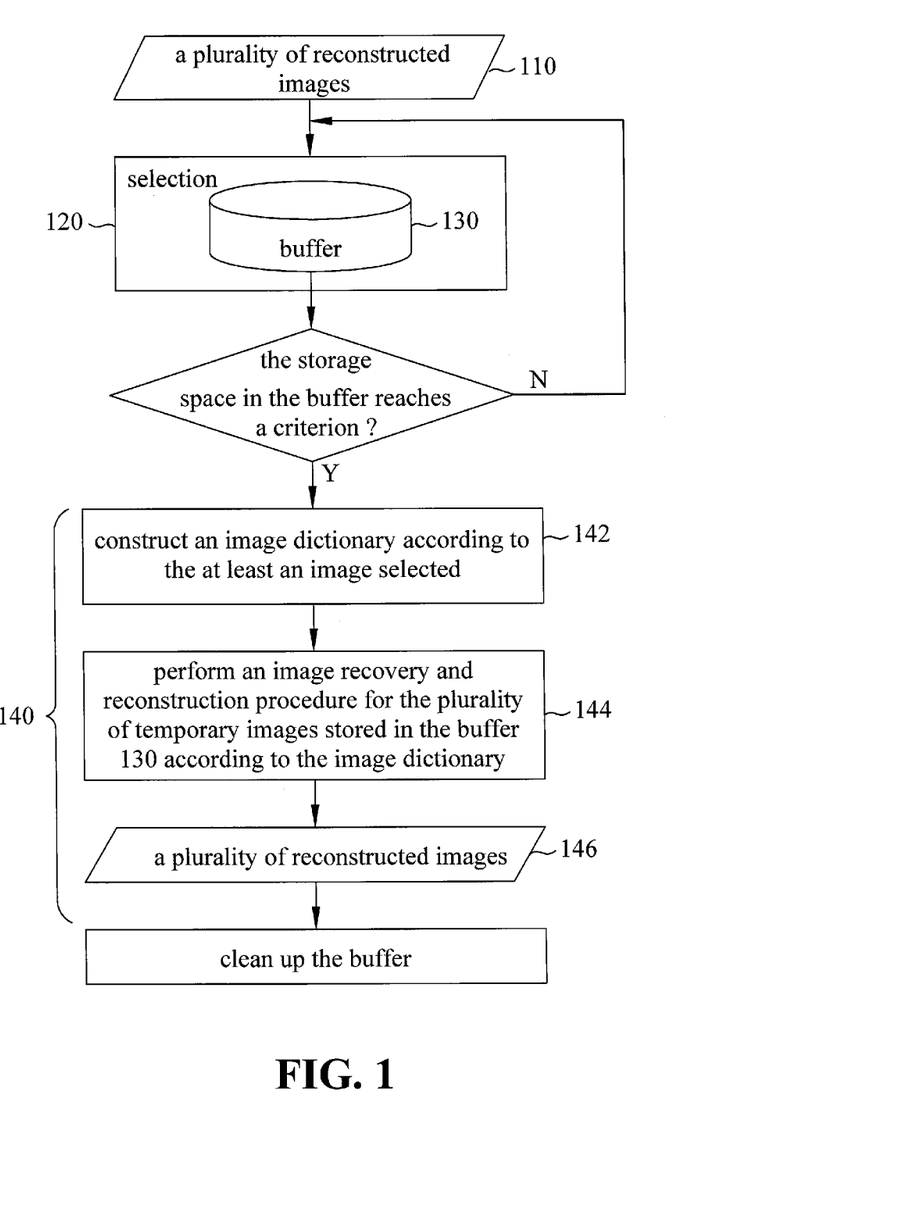
FIG. 1 shows a schematic view of the collaboration of an image processing method and a buffer, in accordance with an exemplary embodiment.

FIG. 1 shows a schematic view of the collaboration of an image processing method and a buffer, in accordance with an exemplary embodiment. Referring to FIG. 1, at least an image is selected from a plurality of inputted images 110 (shown as a selection 120) and the plurality of inputted images is stored into a buffer 130 until a storage space in the buffer 130 reaches a criterion. When the storage space of the buffer 130 reaches a criterion, a video processing procedure 140 is performed on a plurality of temporary images stored in the buffer 130, including constructing an image dictionary according to the at least an image selected (step 142), and performing an image recovery and reconstruction procedure for the plurality of temporary images stored in the buffer 130 according to the image dictionary (step 144), thereby obtaining a plurality of reconstructed images 146.

According to the exemplary embodiments of the present disclosure, after completing the image recovery and reconstruction procedure, the image processing method may clean up the buffer 130. The capacity (storage size) of the buffer 130 is adjustable. For example, the capacity of the buffer 130 may be adjusted according to the features of the plurality of inputted images 110, actual application scenario, or actual application requirements. The criterion which the buffer reaches may be, but not limited to, when the buffer 130 is near full.

In other words, the image processing method is an image reconstruction method based on the sparse representation, self-adaptive, and able to dynamically use a neighboring group of pictures (GOP) as an input to the training image dictionary. The neighboring GOP may include a large portion of repetitive or highly similar partial images. Therefore, the exemplary embodiments may make a selection 120 in advance to select a plurality of representative images from a series of single images, i.e. the plurality of inputted images 110. During the selection 120, a total difference between two images (e.g., a k-th image 205 and a p-th image 215 of a GOP 210 shown in the exemplar of FIG. 2) is computed to determine whether the k-th, (k+1)th, . . . , (p−1)th images are discarded. When the total difference is less than a threshold, the k-th, (k+1)th, . . . , (p−1)th images are discarded. The total difference between two images is the sum of the differences of a plurality of blocks. The plurality of blocks may be, such as, all the blocks of the image, or blocks within a specific range. The following uses all the blocks for explanation, but it is not limited to the present application.

Figure 2:
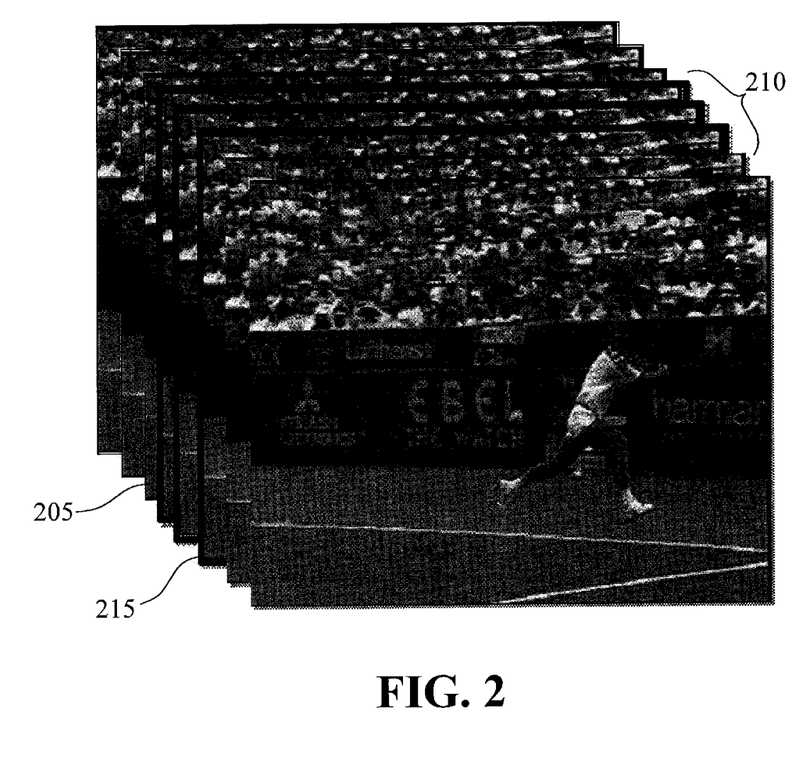
FIG. 2 shows the computation of difference among a plurality of images, in accordance with an embodiment.

FIG. 2 shows the computation of difference between two images, in accordance with an embodiment. As shown in FIG. 2, the difference $B_{diff}$ is computed as follows:

$$B_{diff}=[((M_{i,k}+M_{i,p})/2)^2-((V_{i,k}+V_{i,p})/2)2]^2/(V_{i,k}V_{i,p})$$

wherein $M_{i,k}$ and $V_{i,k}$ are the mean and variance of i-th block of a k-th image respectively, and $M_{i,p}$ and $V_{i,p}$ are the mean and variance of i-th block of a p-th image respectively. The mean and variance are only an exemplar, and other statistic values may be used, such as, mean absolute difference (MAD), mean square error (MSE), minimized maximum error (MME). The k-th image and the p-th image are two images from a GOP 210, and i, k, p are all positive integers, k<p. A small total difference between two images means that the two images have a high similarity. In other words, the p-th image is similar to the k-th image.

When $B_{diff}$ is less than a threshold Tb, the i-th block in both k-th and p-th mages is viewed as indistinguishable. Accordingly, a total difference is obtained by summing all blocks in the k-th and p-th images. When the total difference is less than a threshold Tf, the later image is viewed as indistinguishable from the former image, and thus the k-th, (k+1)th, . . . , (p−1)th images are discarded. According to this scheme, by comparing the temporary images stored in the buffer 130 for similarity and selecting a temporary image set matching a similarity condition (such as, the total difference>threshold Tf in this exemplar). In other words, the temporary images stored in the buffer 130 are selected after the selection 120 to form the temporary image set, which is a remaining image set obtained by filtering out the highly similar images from the inputted series of single images (i.e. the plurality of inputted images 110).

Therefore, the image processing method according to the exemplary embodiments is an image reconstruction method based on sparse representation, self-adaptive, and able to dynamically use the neighboring group of pictures (GOP) as the input to the learning mechanism of the image feature dictionary.

Figure 3:
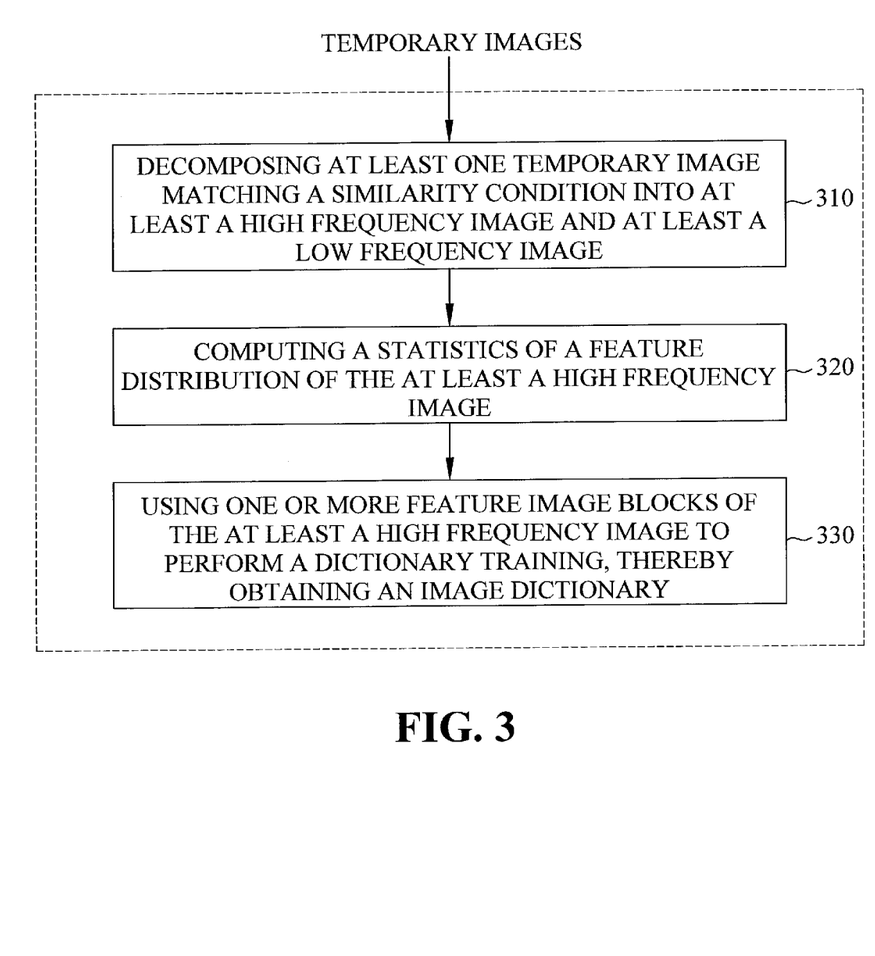
FIG. 3 shows an operation flow of constructing an image dictionary based on image groups, in accordance with an exemplary embodiment.

FIG. 3 shows an operation flow of constructing an image dictionary based on the GOP, in accordance with an exemplary embodiment. In the operation flow of FIG. 3, for a plurality of temporary images stored in the buffer 130, at least one temporary image matching a similarity condition is decomposed into at least a high frequency image and at least a low frequency image (step 310) and a statistics of a feature distribution of the at least a high frequency image is computed (step 320). Then, one or more feature image blocks of the at least a high frequency image are used to perform a dictionary training, thereby obtaining an image dictionary (step 330). In step 310, a low frequency filter may be used to obtain a low frequency information of the at least one temporary image. The ow frequency filter may be, such as, but not limited to, a mean filter, a Gaussian filter, a bilateral filter, a guided filter, and so on. After obtaining the low frequency information of the at least one temporary image (i.e., becoming a low frequency image), the low frequency image is subtracted from an original image to obtain the high frequency information. Accordingly, a temporary image I is decomposed into a high frequency image $I_{HF}$ and a low frequency image $I_{LF}$, which may be expressed as a formula of $I=I_{HF}+I_{LF}$.

According to an exemplary embodiment, the low frequency filter may use a guided filter to obtain the low frequency information of a temporary image. The guided filter is a robust edge-preserving filter, able to eliminate noises from the image and preserve important edge information, as well as prevent the image from over-blurring. In other words, the high frequency and the low frequency parts of the image may be well preserved. According to the exemplary embodiments of the present disclosure, the high frequency image $I_{HF}$ is used to train a high frequency image dictionary $D_{HF}$. The high frequency image dictionary $D_{HF}$ may be decomposed into two sub-dictionaries $D_{HF\_G}$ and $D_{HF\_B}$ according to the geometric features, representing respectively a part with key features and with non-key features of the high frequency image. The key features are the features to be used, such as, gradient features. The non-key features are, such as, blocking effect features, noise features, and so on. $D_{HF\_G}$ is called an image feature dictionary, and $D_{HF\_B}$ is called a non-image feature dictionary.

The blocking effect means the obvious pixel change at the image edge after decoding an image that was compressed by using a block-based method. Therefore, it may be reasonably deduced that the image has an obvious gradient change in vertical and horizontal directions. The common feature extraction operators are, such as, Daisy descriptor, scale-invariant feature transform (SIFT) descriptor, gradient location-orientation histogram (GLOH) descriptor, and so on. In step 320, computing the statistics of the feature distribution of the high frequency image may use a HOG descriptor as feature description of image patch and perform feature statistics. When the HOG feature descriptor is used, only the statistics of angle histograms in vertical and horizontal directions of the training image patch are required to be computed.

Figure 4A:
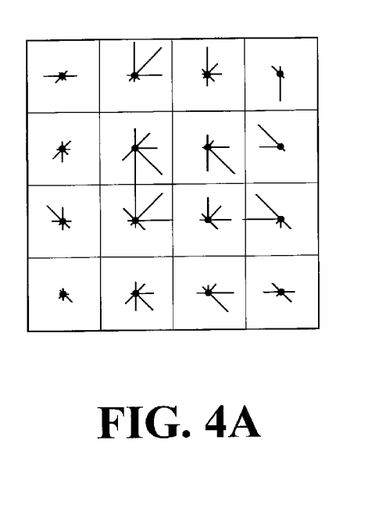
FIGS. 4A-4C show a schematic view of computing a statistics of image features, in accordance with an exemplary embodiment.
Figure 4B:
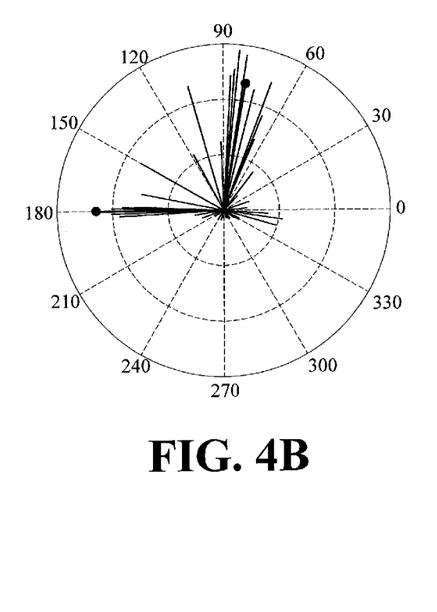
Figure 4C:
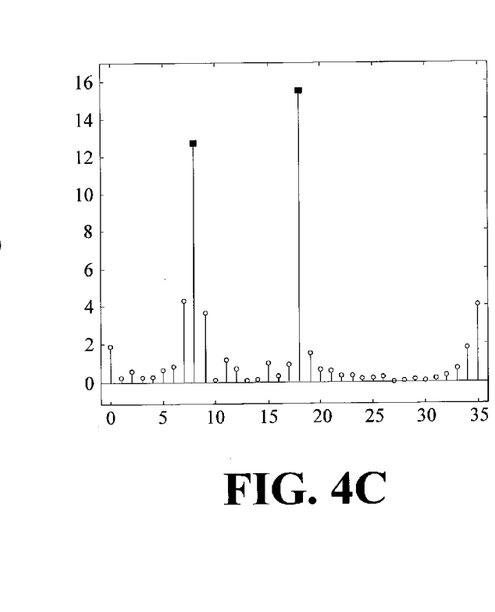

Accordingly, FIGS. 4A-4C show a schematic view of computing a statistics of image features, in accordance with an exemplary embodiment. FIG. 4A shows 16 HOG feature descriptors for a patch of a training image, wherein the training image is divided into 16 blocks, and each of the 16 HOG feature descriptors of the training image patch describes the HOG feature of a block. In FIG. 4B, each HOG feature descriptor is quantified as 360° and a corresponding maximum vector is obtained for the HOG feature descriptor. FIG. 4C is an exemplar showing an angle histogram of the horizontal direction of FIG. 4B. In FIG. 4C, taking horizontal HOG feature descriptors as an example, an angle change is ±5° for a sampling interval, i.e., the sampling interval is [355°, 5°] and [175°, 185°]. If an exemplar of the vertical HOG feature descriptors is taken, the sampling interval is [85°, 95°] and [265°, 275°].

In step 330, the feature image block of the at least a high frequency image is used for performing a dictionary training to obtain a high frequency dictionary $D_{HF}$. The high frequency image dictionary $D_{HF}$ may be decomposed into the image feature dictionary $D_{HF\_G}$ and the non-image feature dictionary $D_{HF\_B}$. When using the aforementioned HOG descriptors as feature description of the image patch for training, the non-image feature dictionary $D_{HF\_B}$ may be further decomposed into a vertical blocking effect sub-dictionary $D_{HF\_BV}$ and a horizontal blocking effect sub-dictionary $D_{HF\_BH}$, and this may be expressed as $D_{HF\_B}=\{D_{HF\_BV}, D_{HF\_BH}\}$.

Figure 5:
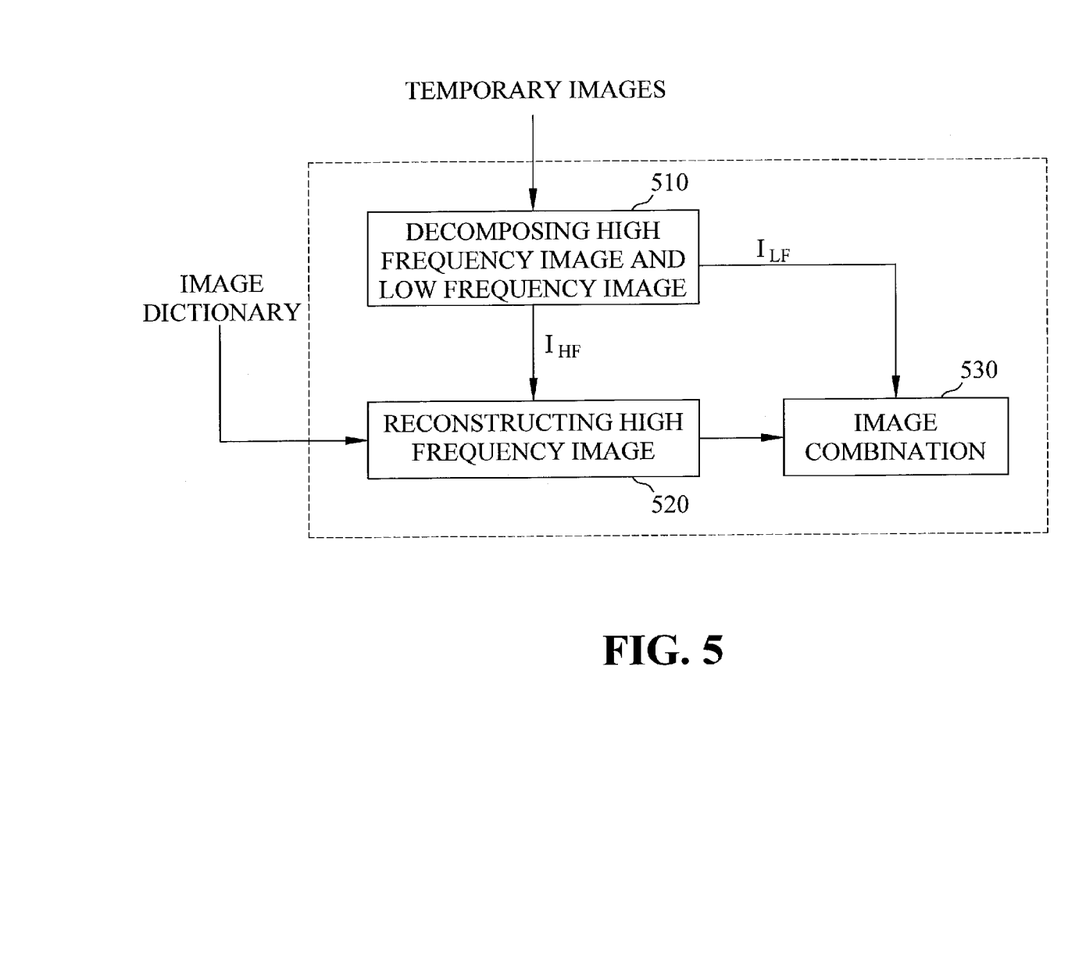
FIG. 5 shows an operation flow of reconstructing an image using an image dictionary, in accordance with an exemplary embodiment.

The construction of the high frequency dictionary $D_{HF}$ may use, such as, K-means, k-means singular value decomposition (K-SVD), online dictionary learning, and so on. According to an exemplary embodiment of the present disclosure. an orthogonal matching pursuit (OMP) algorithm is used to perform sparse coding for recovering an image. FIG. 5 shows an operation flow of reconstructing an image using the image dictionary, in accordance with an exemplary embodiment. Referring to the operation flow in FIG. 5, in decomposing the high frequency image and the low frequency image (step 510), a temporary image may be decomposed into a high frequency image $I_{HF}$ and a low frequency image $I_{LF}$. In reconstructing the high frequency image (step 520), for image blocks in a high frequency image $I_{HF}$ to be recovered, the OMP algorithm is applied on the image feature dictionary $D_{HF\_G}$ of the high frequency image dictionary $D_{HF}$ to perform sparse encoding (that is, performing a multiplication on the non-zero coefficients of sparse vectors in the image feature dictionary $D_{HF\_G}$ and the image feature dictionary $D_{HF\_G}$) to obtain a recovered image block, thereby obtaining a recovered high frequency image. In other words, it may perform the sparse encoding on the image feature dictionary $D_{HF\_G}$ of the high frequency image dictionary $D_{HF}$ to obtain one or more recovered image blocks in the high frequency image $I_{HF}$ t, thereby obtaining a recovered high frequency image. In an image combination (step 530), a low frequency image $I_{LF}$ and a recovered high frequency image $I_{HF}$ are combined, and a reconstructed image is obtained. The exemplar may be expressed as the following formula:

Reconstructed image=low frequency image $I_{LF}$+recovered high frequency image.

Figure 6:
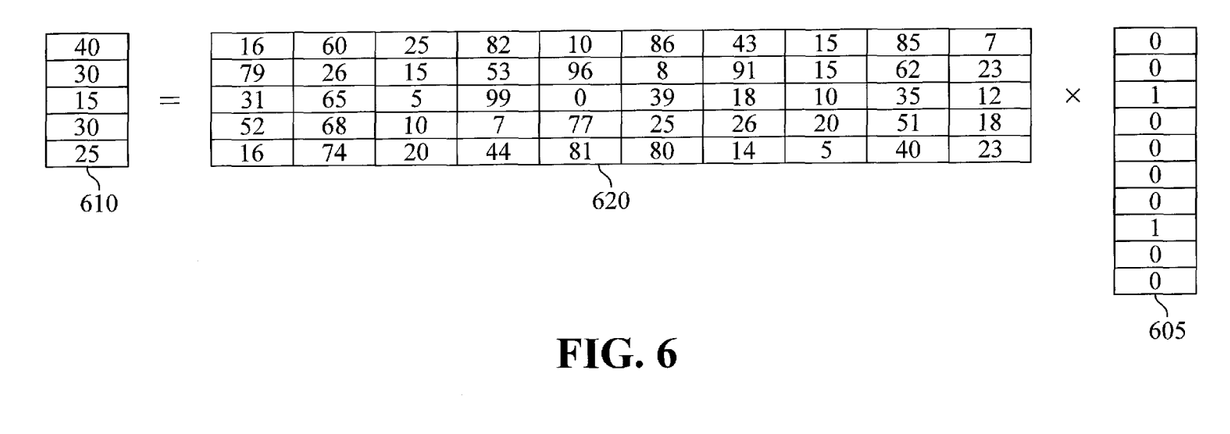
FIG. 6 shows a schematic view of performing a multiplication on an image feature dictionary $D_{HF\_G}$ and non-zero coefficients of sparse vectors to obtain a recovered image block, in accordance with an exemplary embodiment.

FIG. 6 shows a schematic view of performing a multiplication on an image feature dictionary $D_{HF\_G}$ and non-zero coefficients of a sparse vector of the dictionary $D_{HF\_G}$ to obtain a recovered image block, in accordance with an exemplary embodiment. In the exemplar of FIG. 6, a sparse vector 605 only includes two non-zero coefficients 1 (i.e., the third element and the eighth element). A recovered image block 610 is expressed by the pixel value of each pixel in the image block. The exemplar of the image feature dictionary $D_{HF\_G}$ is expressed by the pixel value of each pixel in an image block 620. Therefore, the pixel value of the first pixel in the recovered image block 610 is 25×1+15×1=40, and so on. The pixel value of the fifth pixel in the recovered image block 610 is 20×1+5×1=25.

According to another exemplary embodiment, during reconstructing the high frequency image, for image blocks in the high frequency image $I_{HF}$ to be recovered, it may make a statistics for a specific feature distribution of the high frequency image $I_{HF}$ to construct an image dictionary of a specific attribute targeting the high frequency image dictionary $D_{HF}$. Then, the image dictionary of the specific attribute obtained by training is used to perform a recovery on the local area(s) of the high frequency image $I_{HF}$, to process and reconstruct a local area of an original image, such as, a partial license tag of a car or a human face of a person.

Figure 7:
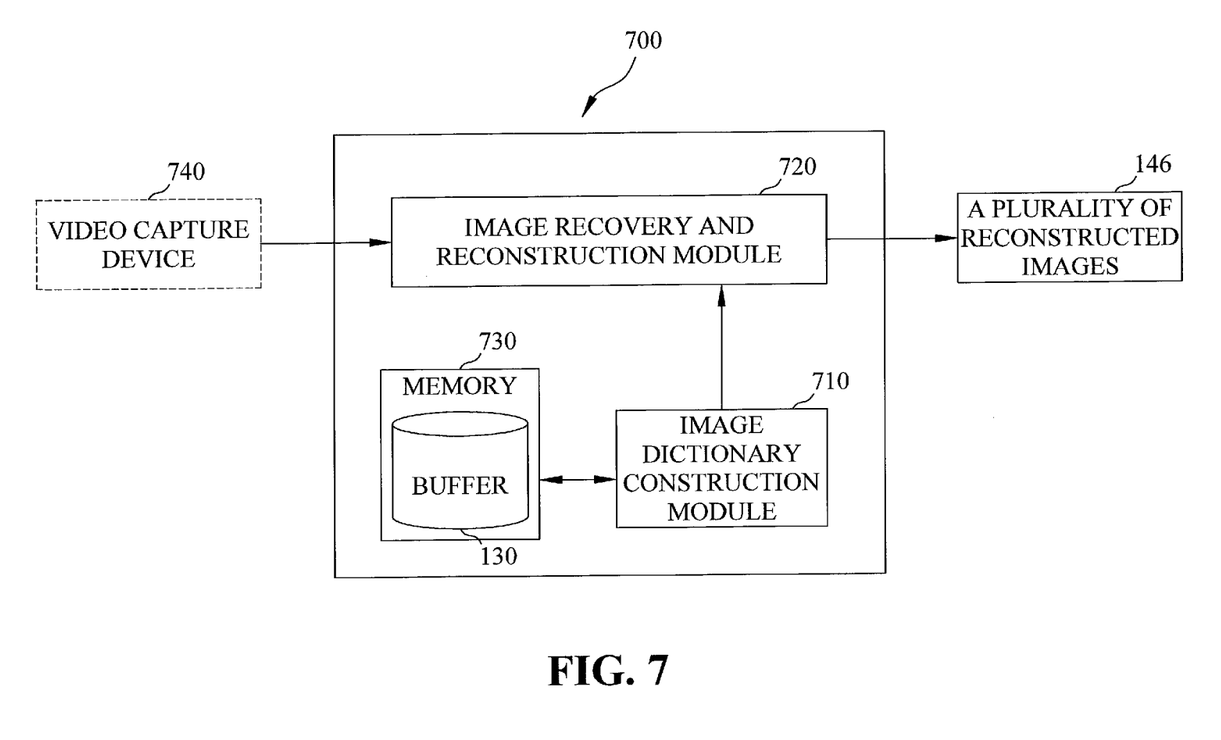
FIG. 7 shows an image processing apparatus, in accordance with an exemplary embodiment.

Accordingly, FIG. 7 shows an image processing apparatus, in accordance with an exemplary embodiment. Referring to FIG. 7, an image processing apparatus 700 may comprise an image dictionary construction module 710, an image recovery and reconstruction module 720 and a memory 730. The apparatus 700 may collaborate with the buffer 130 in the memory 730. The image dictionary construction module 710 selects at least an image from a plurality of images and stores the plurality of images into the buffer 130, and determines whether to perform a learning of an image dictionary according to a storage space of the buffer 130. When the storage space of the buffer 130 reaches a criterion, for a plurality of temporary images stored in the buffer 130, at least a temporary image matching an image similarity condition is decomposed into at least a high frequency image and at least a low frequency image, and a statistic of a features distribution of the at least a high frequency image is computed to construct the image dictionary. The image recovery and reconstruction module 720 performs a recovery on a plurality of high frequency images in a plurality of temporary images stored in the buffer 130 according to the image dictionary, and combines a plurality of recovered high frequency images, and a plurality of low frequency images obtained from the plurality of temporary images, thereby obtaining a plurality of reconstructed images 146.

In the image processing apparatus 700, the image dictionary construction module 710 and the image recovery and reconstruction module 720 may be realized by, such as, a processor or an integrated circuit (IC). The plurality of inputted images may be obtained by, such as, a video capture device 740, capturing a series of single images. The apparatus 700 may use a neighboring GOP as an input to train the image dictionary. The details of constructing the image dictionary and the image recovery and reconstruction are described in earlier exemplary embodiments, and will not be repeated here.

According to an exemplary embodiment, the image processing technique may refer only to picture(s) of GOP as reference image(s) for dictionary training. In principle, the memory space used as the buffer for storing temporary images may be saved and the subsequent image reconstruction may be accelerated.

Take 100 pictures as a group as an example. According to the exemplary embodiments of the present disclosure, it only needs to train 3 image dictionaries for a standard experimental video (such as, 300 pictures) for reconstructing an entire image of the standard experimental video. In conditions of different compression ratios (such as, 32, 64 and 128 kbps), the PSNR is used as the measurement to evaluate the quality of a reconstructed video image, and SSIM is used as quality index for analysis. The quality index SSIM uses the combination of three different factors, i.e. luminance, contrast and structure, to measure the similarity of every pair of images.

Figure 8A:
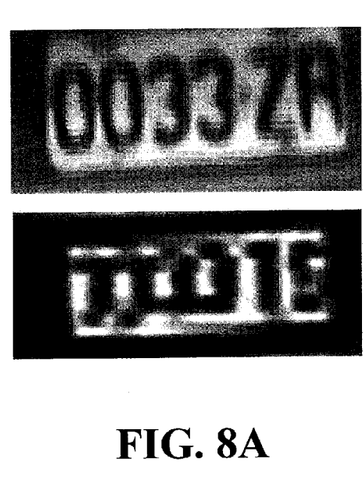
FIGS. 8A-8C show schematic views of processing and reconstructing partial license tag in a surveillance video, in accordance with an exemplary embodiment.
Figure 8B:
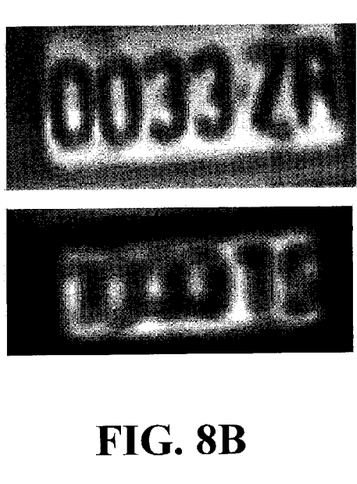
Figure 8C:
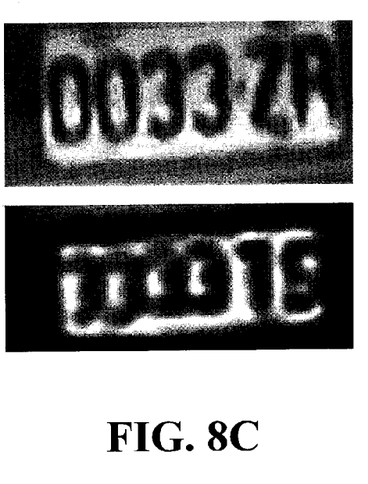

According to the exemplary embodiments of the present disclosure, it may also process the reconstruction of a partial license tag or a human face in a surveillance video in addition to adjusting the video quality. FIGS. 8A-8C show schematic views of processing and reconstructing partial license tag in a surveillance video, in accordance with an exemplary embodiment. Wherein, FIG. 8A is an original license tag in a surveillance video from a road intersection. FIG. 8B is the low quality image using x264 compression, and FIG. 8C shows the recovered and reconstructed image, according to the exemplary embodiment of the present disclosure.

In summary, a method and apparatus for image processing is provided, according to the exemplary embodiments of the present invention. The technique comprises a dynamically adjusted image dictionary learning mechanism. After obtaining and storing a series of continuous images into a buffer, the technique determines whether to perform a learning of an image dictionary, based on the capacity of the buffer. The temporary images stored in the buffer are used and the difference among the temporary images is computed. The at least a temporary image satisfying a difference threshold is decomposed into at least a high frequency image and at least a low frequency image, and a statistics of the feature distribution of the at least a high frequency image is computed to construct an image dictionary of a specific attribute. The image dictionary of the specific attribute obtained through training is used to recover the high frequency images of plurality of temporary images stored in the buffer, and combines the recovered high frequency images of the plurality of temporary images stored in the buffer, and a plurality of low frequency images obtained from the plurality of temporary images, thereby obtaining a plurality of reconstructed images.

The aforementioned image processing method may be realized by instructions in a computer readable medium. When a computer reads the instructions from the computer readable medium, the instructions are executed to perform the said image processing method. The computer readable medium may be, such as, floppy, hard disk, CD CD-ROM, CD-RW, ROM, RAM EPROM, EEPROM or flash memory. The computer may include any suitable processing platform, device or system, computing platform, and so on.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image processing method, comprising:
   selecting at least one image from a plurality of images, and storing the plurality of images into a buffer, until a storage space of the buffer reaches a criterion; and
   when the buffer reaches the criterion, a procedure of video processing is performed for a plurality of temporary images in the buffer, which includes constructing an image dictionary according to the at least one image selected, and performing an image recovery and reconstruction procedure for the plurality of temporary images in the buffer according to the image dictionary, thereby obtaining a plurality of reconstructed images.

2. The method as claimed in claim 1, wherein during the selecting, the method computes a similarity between a k-th image and a p-th image of a group of pictures to determine whether to discard k-th, (k+1)th, . . . , (p−1)th images, and when a total difference between the k-th image and the p-th image is less than a threshold, the k-th, (k+1)th, . . . , (p−1)th images are discarded, p>k.

3. The method as claimed in claim 2, wherein the total difference is a sum of a difference of each of a plurality of blocks of the k-th image and the p-th image, and when the total difference is less than the threshold, the p-th image is similar to the k-th image.

4. The method as claimed in claim 3, wherein the method further includes:
   comparing the similarity of the plurality of temporary images stored in the buffer and selecting a temporary image set matching a similarity condition, the similarity condition is the total difference is greater than the threshold.

5. The method as claimed in claim 1, wherein the method uses a neighboring group of pictures as an input to for training the image dictionary.

6. The method as claimed in claim 1, wherein the storage space of the buffer has an adjustable size.

7. The method as claimed in claim 1, wherein constructing the image dictionary further includes:
   for the plurality of temporary images stored in the buffer, decomposing at least a temporary image matching an image similarity condition into at least a high frequency image and at least a low frequency image; computing statistics of a feature distribution of the at least a high frequency image; and using a plurality of feature image blocks of the at least a high frequency image to perform a dictionary training to obtain the image dictionary.

8. The method as claimed in claim 1, wherein the image recovery and reconstruction procedure further includes:

decomposing the plurality of temporary images stored in the buffer into a plurality of high frequency images and a plurality of low frequency images, and using at least a high frequency image to train a high frequency image dictionary;

performing a sparse encoding on an image feature dictionary of the high frequency image dictionary to obtain one or more recovered image blocks of the plurality of high frequency images, thereby obtaining a plurality of recovered high frequency images; and combining the plurality of low frequency images and the plurality of recovered high frequency images, thereby obtaining the plurality of reconstructed images.

9. The method as claimed in claim 1, wherein the method further includes:

cleaning up the buffer.

10. The method as claimed in claim 8, wherein the image feature dictionary is a part of the at least a high frequency image with a key feature.

11. The method as claimed in claim 7, wherein the feature distribution is a specific feature distribution and the image dictionary is an image dictionary of a specific attribute.

12. An image processing apparatus, comprising:

an image dictionary construction module that selects at least one image from a plurality of images, and stores the plurality of images into a buffer, until a storage space of the buffer reaches a criterion; for a plurality of temporary images stored in the buffer, decomposes at least a temporary image matching an image similarity condition into at least a high frequency image and at least a low frequency image; and computes statistics of a feature distribution of the at least a high frequency image to construct an image dictionary; and an image recovery and reconstruction module that performs an image recovery and reconstruction for a plurality of high frequency images of the plurality of temporary images stored in the buffer according to the image dictionary, and combines a plurality of recovered high frequency images, and a plurality of low frequency images obtained from the plurality of temporary images, thereby obtaining a plurality of reconstructed images.

13. The apparatus as claimed in claim 12, wherein the image dictionary construction module and the image recovery and reconstruction module are implemented with a processor or an integrated circuit.

14. The apparatus as claimed in claim 12, wherein the plurality of images are a continuous series of single images obtained by a video capture device.

15. The apparatus as claimed in claim 12, wherein the apparatus uses a neighboring group of pictures as an input for training the image dictionary.

16. The apparatus as claimed in claim 12, wherein the storage space of the buffer has an adjustable size.

17. The apparatus as claimed in claim 12, wherein the image dictionary construction module computes a similarity between a k-th image and a p-th image of a group of pictures to determine whether to discard k-th, (k+1)th, . . . , (p−1)th images; and when a total difference between the k-th image and the p-th image is less than a threshold, the k-th, (k+1)th, . . . , (p−1)th images are discarded, p>k.

18. The apparatus as claimed in claim 17, wherein the total difference is a sum of a difference of each of a plurality of blocks of the k-th image and the p-th image; and when the total difference is less than the threshold, the p-th image is similar to the k-th image.

19. The apparatus as claimed in claim 12, wherein the image dictionary construction module uses a plurality of feature image blocks of the at least a high frequency image to perform a dictionary training to obtain a high frequency image dictionary, and the high frequency image dictionary is decomposed to an image feature dictionary and a non-image feature dictionary.

20. A non-transitory computer readable medium, comprising a plurality of instructions; wherein the plurality of instructions execute the image processing method as claimed in claim 1.

* * * * *